United States Patent
Watanabe et al.

(10) Patent No.: US 6,889,786 B2
(45) Date of Patent: May 10, 2005

(54) AUTOMATIC BRAKE SYSTEM OF WHEELED MOTOR VEHICLE

(75) Inventors: Takayuki Watanabe, Kanagawa (JP); Katsunori Yamada, Yokohama (JP)

(73) Assignee: Nissan Motor Co., Ltd., Yokohama (JP)

( * ) Notice: Subject to any disclaimer, the term of this patent is extended or adjusted under 35 U.S.C. 154(b) by 123 days.

(21) Appl. No.: 10/299,758

(22) Filed: Nov. 20, 2002

(65) Prior Publication Data

US 2003/0106732 A1 Jun. 12, 2003

(30) Foreign Application Priority Data

Dec. 11, 2001 (JP) ........................................ 2001-377716

(51) Int. Cl.$^7$ ................................................. B60T 7/12
(52) U.S. Cl. ........................ 180/167; 180/169; 180/271
(58) Field of Search ................................ 180/167, 169, 180/170, 271, 274, 275

(56) References Cited

U.S. PATENT DOCUMENTS

| | | | | |
|---|---|---|---|---|
| 5,461,357 A | * | 10/1995 | Yoshioka et al. | 340/435 |
| 5,678,650 A | * | 10/1997 | Ishihara et al. | 180/169 |
| 5,684,473 A | * | 11/1997 | Hibino et al. | 340/903 |
| 5,808,561 A | * | 9/1998 | Kinoshita et al. | 340/903 |
| 5,921,641 A | * | 7/1999 | Lupges et al. | 303/191 |
| 5,995,037 A | | 11/1999 | Matsuda et al. | |
| 6,021,375 A | * | 2/2000 | Urai et al. | 701/301 |
| 6,070,682 A | * | 6/2000 | Isogai et al. | 180/167 |
| 6,121,896 A | * | 9/2000 | Rahman | 340/902 |
| 6,259,992 B1 | | 7/2001 | Urai et al. | |
| 6,275,772 B1 | | 8/2001 | Sugimoto et al. | |
| 6,308,796 B1 | * | 10/2001 | Fuchs et al. | 180/169 |
| 6,470,986 B2 | * | 10/2002 | Fuchs et al. | 180/169 |
| 6,474,753 B1 | * | 11/2002 | Rieth et al. | 303/191 |
| 6,624,747 B1 | * | 9/2003 | Friederich et al. | 340/436 |

FOREIGN PATENT DOCUMENTS

| | | |
|---|---|---|
| JP | 6-298022 | 10/1994 |
| JP | 7-69188 | 3/1995 |
| JP | 10-11700 | 1/1998 |

* cited by examiner

*Primary Examiner*—Christopher P. Ellis
*Assistant Examiner*—Kelly E Campbell
(74) *Attorney, Agent, or Firm*—Foley & Lardner LLP

(57) ABSTRACT

A collision avoidance judging section is provided which, based on a relative connection between own vehicle and preceding vehicle, carries out a judgment as to whether or not a possible collision is avoidable by operating at least one of a steering wheel and a brake pedal, and a collision avoidance estimating section is provided which, based on the relative connection, carries out an estimation as to whether or not, after expiration of a predetermined time from the time of detection of the relative connection, a possible collision is avoidable by operating at least one of the steering wheel and brake pedal. When the collision avoidance estimating section estimates that the possible collision is unavoidable, a lower braking force is produced, and when the collision avoidance judging section judges that the possible collision is unavoidable, a higher braking force is produced.

11 Claims, 7 Drawing Sheets

AUTOMATIC BRAKE SYSTEM OF WHEELED MOTOR VEHICLE

BACKGROUND OF INVENTION

1. Field of Invention

The present invention relates in general to brake systems of wheeled motor vehicles, and more particularly to the brake systems of an automatic type that automatically brakes own vehicle when a collision against a preceding object or vehicle is highly estimated.

2. Description of Related Art

Hitherto, for the purpose of safety driving, various automatic brake systems of the above-mentioned type have been proposed and put into practical use in the field of wheeled motor vehicles.

Some of the automatic brake systems are of a type that includes a radar device mounted on the own vehicle for detecting a vehicle interval distance between the own vehicle and the preceding vehicle and automatically brakes the own vehicle when a collision against the preceding vehicle is highly estimated with respect to the detected vehicle interval distance and speeds of the two vehicles.

Laid-open Japanese Patent Application (Tokkaihei) 6-298022 shows an automatic brake system of the above-mentioned type. In the system of this publication, a first safety distance capable of avoiding a collision by a brake pedal operation and a second safety distance capable of avoiding the collision by a steering wheel operation are both calculated. When a detected vehicle interval distance is smaller than either of the first and second safety distances, automatic braking takes place.

Furthermore, Laid-open Japanese Patent Application (Tokkaihei) 7-69188 shows an automatic brake system that, upon sensing the highly estimated vehicle collision, applies a slight pre-braking to the vehicle before applying a main braking for forewarning the driver of the main braking.

However, due to inherent constructions, even the automatic brake systems of these publications have failed to provide the users with a satisfied performance.

SUMMARY OF INVENTION

It is therefore an object of the present invention to provide an automatic brake system of a wheeled motor vehicle, which is superior to the above-mentioned brake systems.

More specifically, the present invention aims to provide an automatic brake system of a wheeled motor vehicle, which can brake the vehicle at an assured timing without providing a driver with an uncomfortable braking shock.

According to the present invention, there is provided an automatic brake system of a wheeled motor vehicle that has a brake pedal and a steering wheel installed therein. The system comprises a first section that detects a relative connection between the vehicle and a preceding object ahead of the vehicle; a second section that, when actuated, produces a braking force applied to the vehicle, the braking force produced by the second section being isolated from a braking force produced by the brake pedal; a third section that, based on the relative connection detected by the first section, carries out a judgment as to whether or not a possible collision of the vehicle with the preceding object is avoidable by operation of at least one of the steering wheel and the brake pedal; a fourth section that, based on the relative connection detected by the first section, carries out an estimation as to whether or not, after expiration of a predetermined time from the time of detection of the relative connection, a possible collision of the vehicle with the preceding object is avoidable by operation of at least one of the steering wheel and the brake pedal; a fifth section that actuates and controls the second section in accordance with both a result of the judgment made by the third section and a result of the judgment made by the fourth section, thereby to control the braking force applied to the vehicle, wherein the fifth section is configured to carry out causing the second section to produce a first grade braking force when the fourth section estimates that after expiration of the predetermined time the possible collision would be unavoidable by operation of either of the steering wheel and the brake pedal; and causing the second section to produce a second grade braking force when the third section judges that the possible collision would be unavoidable by operation of either of the steering wheel and the brake pedal, the second grade braking force being greater than the first grade braking force.

DETAILED DESCRIPTION OF EMBODIMENT

Figure 1:
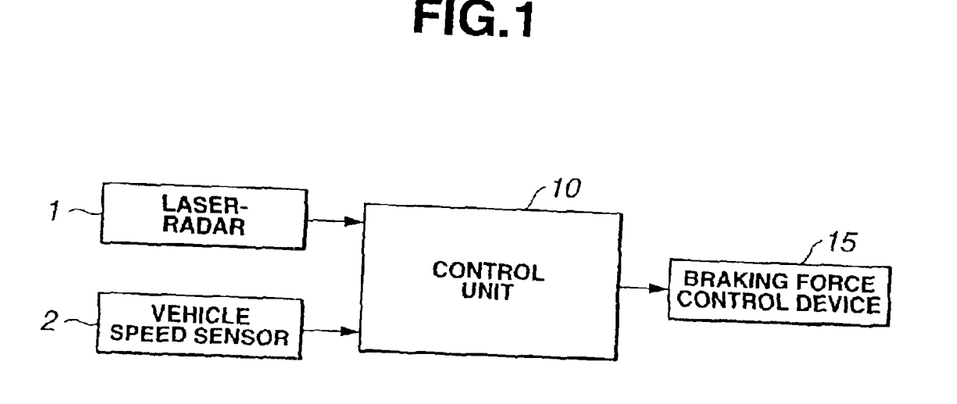
FIG. 1 is a schematic block diagram of an automatic brake system of a wheeled motor vehicle according to the present invention.

In FIG. 1, there is shown a block diagram of an automatic brake system of the present invention.

In the drawing, denoted by numeral 1 is a scanning type laser-radar that detects a vehicle interval distance, that is, the distance between own vehicle and a preceding vehicle. It is to be noted that the own vehicle is the vehicle that has the automatic brake system of the invention mounted thereon, and the preceding vehicle is the vehicle that is running ahead of the own vehicle.

Laser-radar 1 is mounted on a laterally middle front position of the own vehicle. Laser-radar 1 emits periodically a laser ray forward scanning over a predetermined angle range and receives a laser ray that has been reflected from the preceding vehicle. Based on a time difference between the laser ray emitting timing and laser ray receiving timing, a vehicle interval distance between the preceding vehicle and the own vehicle is actually measured in each scanning angle. Denoted by numeral 2 is a vehicle speed sensor that detects a vehicle speed of the own vehicle. Information signals from laser-radar 1 and vehicle speed sensor 2 are led into a control unit 10. Control unit 10 has a micro-processor that comprises generally a central processing unit (CPU), a random access memory (RAM), a read only memory (ROM) and input and output interfaces.

In control unit 10, a automatic brake control process is carried out in a predetermined period. That is, based on the information signals from laser-radar 1 and vehicle speed sensor 2, judgment is carried out as to whether an automatic braking is needed or not. If need is judged, control unit 10 controls a braking force control device 15 to produce a controlled braking force applied to road wheels of the own vehicle. It is to be noted that braking force control device 15 is of a brake-by-wire type which has no direct connection with a brake pedal mounted in the own vehicle.

Figure 2:
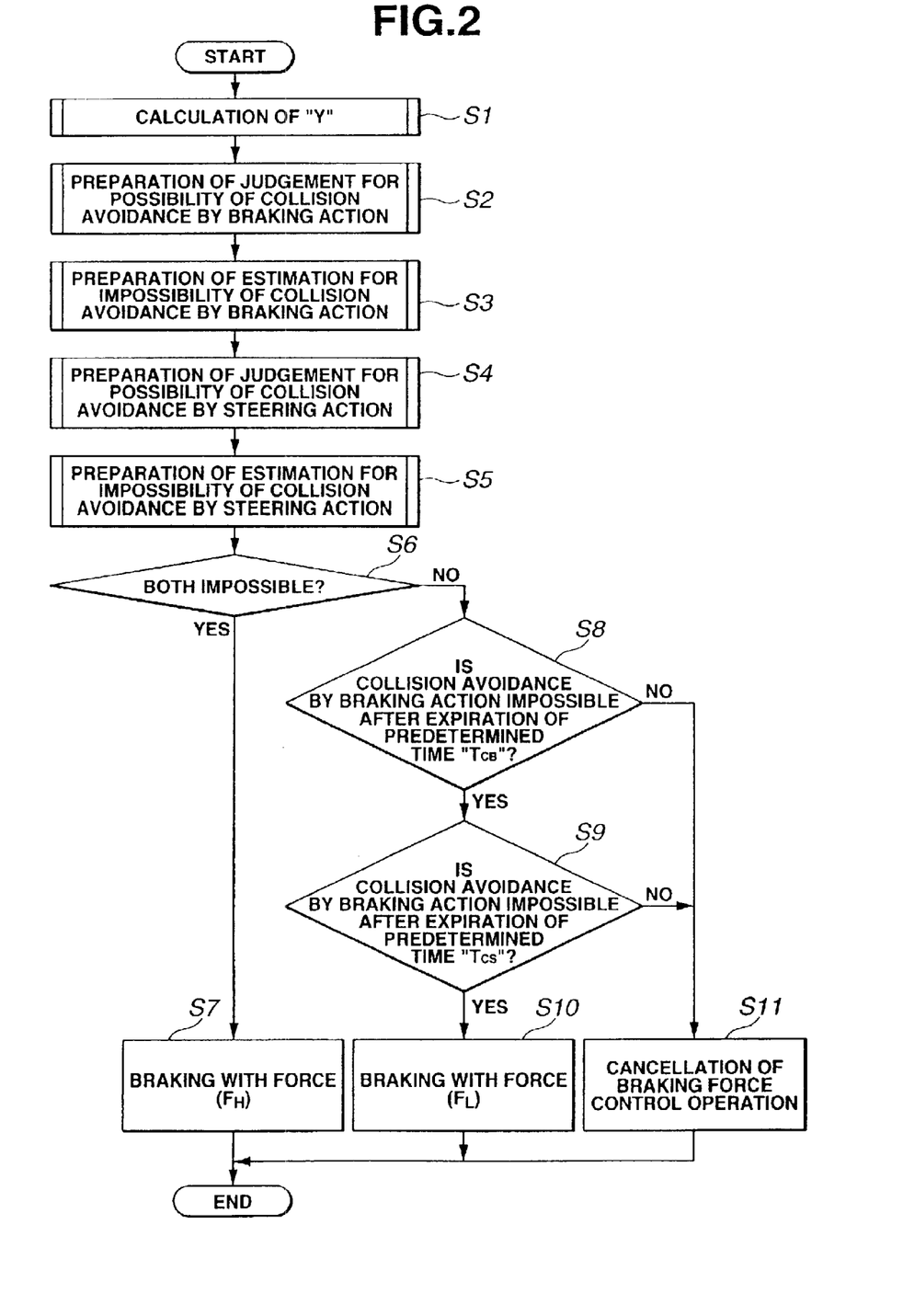
FIG. 2 is a flowchart showing programmed operation steps executed by a control unit employed in the present invention.

Referring to FIG. 2, there is shown a flowchart that depicts programmed operation steps executed by control unit 10.

That is, at step S1, a needed lateral moved distance "Y" is calculated. For this calculation, information signals from laser-radar are read and based on these signals, a relative vehicle interval distance "d" and a relative vehicle speed "Vr" in the traveling direction of the own vehicle are detected. Furthermore, based on the information signals from laser-radar 1, distances between each of right and left rear edges of the preceding vehicle and a laser-emitter of laser-radar 1 and angles of the right and left rear edges of the preceding vehicle relative to the laser-emitter of laser-radar 1 are detected. Based on these detected data, the lateral moved distance "Y" needed for avoiding a possible collision of the own vehicle with the preceding vehicle is calculated.

The relative vehicle speed "Vr" is provided by differentiating the relative vehicle interval distance "d" with time, that is, by treating the signal of the distance "d" by a band-pass filter.

Figure 3:
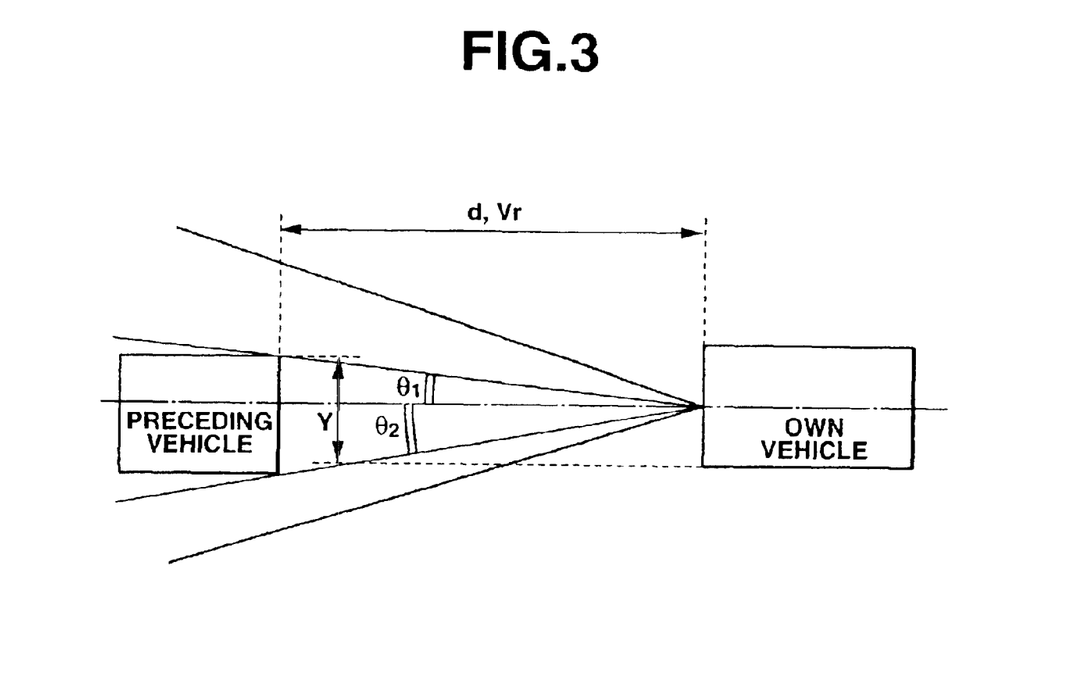
FIG. 3 is an illustration showing the concept of measuring the vehicle interval distance by using a scanning type laser-radar.

The right and left rear edges of the preceding vehicle are detected based on the detected information signals provided by laser-radar 1, and based on angles of the right and left rear edges with respect to the own vehicle, the needed lateral moved distance "Y" is calculated. That is, as is seen from FIG. 3, with respect to the traveling direction of own vehicle, the angles "$\theta_1$" and "$\theta_2$" of the right and left rear edges of the preceding vehicle are derived based on detected information signals from laser-radar 1 and a scanning angle of the emitted laser beam. Then, the smaller angle, that is, the angle "$\theta_1$" in the two angles, is selected for calculating the needed lateral moved distance "Y" by using the following equation (1):

$$Y = d \times \sin(\theta) + Lw/2 \quad (1)$$

wherein:
Lw: width of own vehicle

It is to be noted that equation (1) is based on a case wherein laser-radar 1 is located at the laterally middle portion of a front end of the own vehicle. Thus, when laser-radar 1 is located at a position offset from the laterally middle portion, it is necessary to modify the equation (1) by taking the offset degree into consideration.

When the own vehicle is considerably offset to the preceding vehicle with respect to the traveling path, it sometimes occurs that one of the angles "$\theta_1$" and "$\theta_2$" of the right and left rear edges of the preceding vehicle fails to be detected. However, in such case, the other one, that is, the detected one is used in the equation (1) for deriving the needed lateral moved distance "Y".

In the above mentioned case, as the laser-radar 1, a scanning type is used. However, in place of such type, a multi-beam type may be also used in the present invention.

Figure 4:
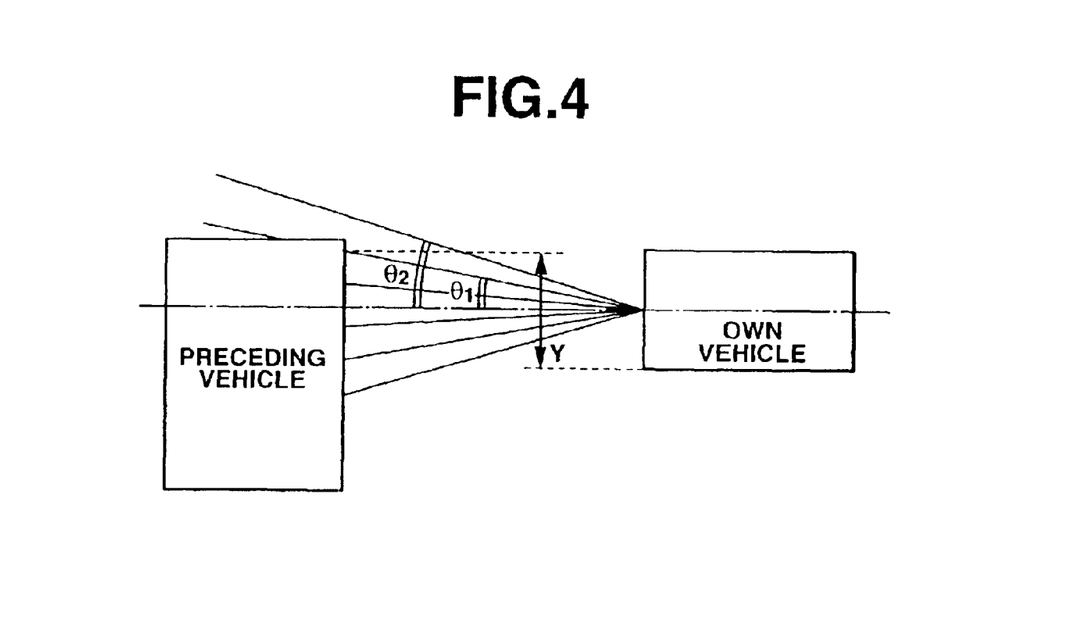
FIG. 4 is an illustration showing the concept of measuring the vehicle interval distance by using a multi-beam type laser-radar.

That is, in case of the multi-beam type laser-radar, as is shown in FIG. 4, based on detected information signals from laser-radar 1, the preceding vehicle is detected as an object placed in a zone having a certain width.

In case of FIG. 4, judgment is so made that, with respect to the traveling direction of own vehicle, a right side end of the preceding vehicle is placed at a right position within an angular zone from a position of angle "$\theta_1$" to a position of angle of "$\theta_2$". In the illustrated case, the position of the right rear edge of the preceding vehicle is treated as the position of the smallest angle "$\theta_1$", and the above equation (1) is used for deriving a needed lateral moved distance "Y" using the angle "$\theta_1$" as "$\theta$".

If, like in the above-mentioned scanning type laser-radar 1, only one of the right and left rear edges of the preceding vehicle is detected, the angle of the detected right or left rear edge is used in the equation (1) for obtaining the needed lateral moved distance "Y".

Furthermore, when laser-radar 1 is located at a position offset from the laterally middle portion of the own vehicle, there is a need of modifying the equation (1) by taking the offset degree into consideration.

As is described hereinabove, even when the offset degree of the preceding vehicle relative to the own vehicle varies, the lateral moved distance needed for avoiding a possible collision against the preceding vehicle by handling a steering wheel is calculated in accordance with the various situations. Thus, calculation for judging whether the collision would be avoided by handing the steering wheel is precisely carried out.

Referring back to the flowchart of FIG. 2, at step S2, preparation of judgment for possibility of collision avoidance by a braking action is made. That is, the judgment is carried out as to whether or not the vehicle collision would be avoided by depressing a brake pedal of the own vehicle.

That is, as is shown in FIG. 3, for ease of description, assumption is so made that the vehicle interval distance and the relative vehicle speed are "d" and "Vr" respectively. When now a deceleration obtained when braking the own vehicle for avoiding the collision is assumed "a" (for example, 8.0 m/s$^2$) and a dead time elapsed from a time when a brake pedal is depressed by a driver to a time when due to the brake pedal depression a certain deceleration is actually produced is assumed "$T_d$" (for example, 0.2 sec), avoidance of vehicle collision by operating the brake pedal is judged possible only when satisfying the following inequality (2), $$d < -Vr \times T_d + (Vr)^2/(2 \times a) \quad (2)$$

Thus, by applying the relative vehicle interval distance "d" and relative vehicle speed "Vr", which are derived at step S1, to the above inequality (2), judgment is carried out.

Then, the operation flow goes to step S3. At this step, if avoiding of collision by the braking action has been judged possible at step S2, estimation is carried out as to whether after expiration of a predetermined time $T_{CB}$, avoiding of collision by the braking action is impossible or not. That is, if the following inequality (3) is satisfied or not:

$$d < -Vr \times T_d + (Vr)^2/(2 \times a) + Vr \times T_{CB} \quad (3)$$

Then, the operation flow goes to step S4. At this step, judgment is carried out as to whether avoiding of collision by the steering action is possible or not.

That is, a time "Ty" needed by the own vehicle for carrying out a lateral movement by the lateral moved distance "Y" is calculated. Now, a steering characteristic of the own vehicle is represented by the following equations (4) and (5):

$$m \times v \times (r + d\beta/dt) = 2 \times Y_F + 2 \times Y_R \quad (4)$$

$$I_Z \times dr/dt = 2 \times 1_F \times Y_F - 2 \times 1_R \times Y_R \quad (5)$$

$$Y_F = f_F \times [\beta + (1_F/v) \times r - \theta_F]$$

$$Y_R = f_R \times [\beta - (1_R/v) \times r]$$

wherein:
- m: weight of vehicle;
- $I_Z$: inertia moment of vehicle in yaw direction;
- v: speed of vehicle;
- r: yaw rate
- β: slip angle of vehicle body;
- $1_F$: distance between center of gravity of vehicle body and an axis passing through centers of front wheels;
- $1_R$: distance between center of gravity of vehicle body and axis passing through centers of rear wheels;
- $Y_F$: lateral force generated in front wheels;
- $Y_R$: lateral force generated in rear wheels; and
- $\theta_F$: steered angle of front wheels.

Figure 5:
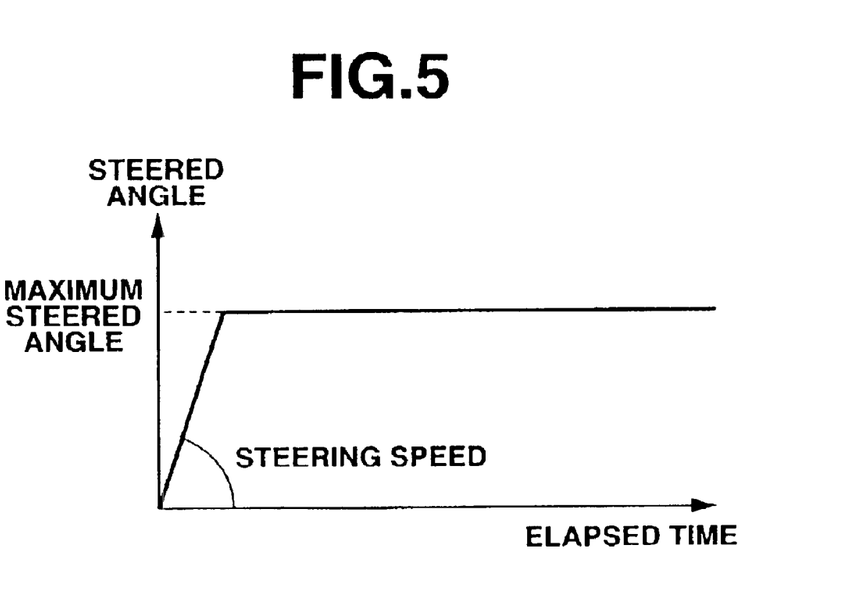
FIG. 5 is a characteristic graph depicting a steering action made by a driver in an emergency.

For providing the equations (4) and (5), assumption is so made that, as is seen from the graph of FIG. 5, in an emergency, a driver turns a steering wheel to a maximum steered position (viz., by a maximum steered angle) at a certain steering speed. In FIG. 5, the x-axis indicates an elapsed time and y-axis indicates a steered angle. That is, as shown in the graph, assumption is so made that in an emergency, with increase of time, the steered angle is instantly increased to the maximum value at a certain steering speed (viz., gradient) and after coming to the maximum value, the steered angle is kept at the maximum value.

Figure 6:
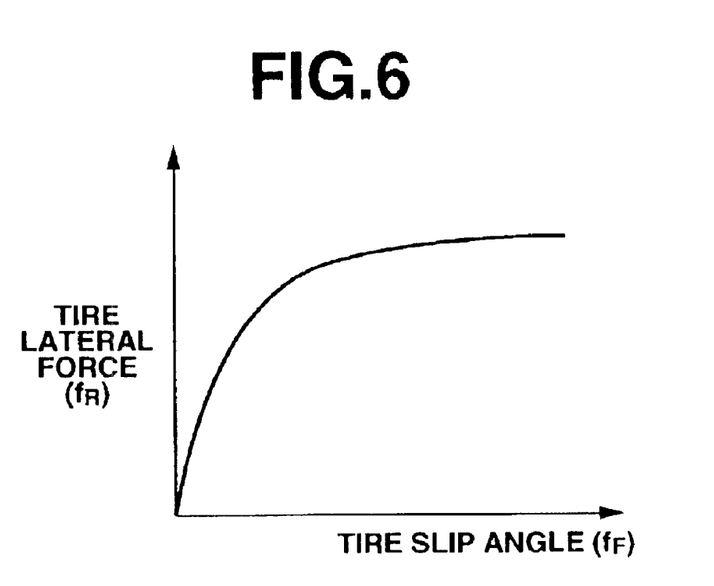
FIG. 6 is a characteristic graph showing a relationship between a tire slip angle and a tire lateral force.

It is to be noted that "$f_F$" and "$f_R$" are functions that represent correspondence to a tire slip angle and a tire lateral force respectively. FIG. 6 is a graph showing the relationship between tire slip angle "$f_F$" and tire lateral force "$f_R$". As shown, with increase of tire slip angle "$f_F$", tire lateral force "$f_R$" increases, and at a smaller zone of tire slip angle "$f_F$", variation of tire lateral force "$f_R$" relative to tire slip angle "$f_F$" is high.

Now, the lateral moved distance "Y" is represented by the following equation (6), that is, by vehicle speed "v", yaw rate "r" and vehicle body slip angle "β":

$$Y = \int [v \times \sin(\int r \, dt + \beta)] dt \quad (6)$$

Accordingly, by practically using the equations (4), (5) and (6), the time "Ty" needed for carrying out the lateral movement by the lateral moved distance "Y" can be calculated.

If the equations (4), (5) and (6) are executed on an on-line system, a longer time is inevitably needed. Thus, if desired, such execution may be carried out on an off-line. In this case, the results are depicted by a map as shown in FIG. 7.

Figure 7:
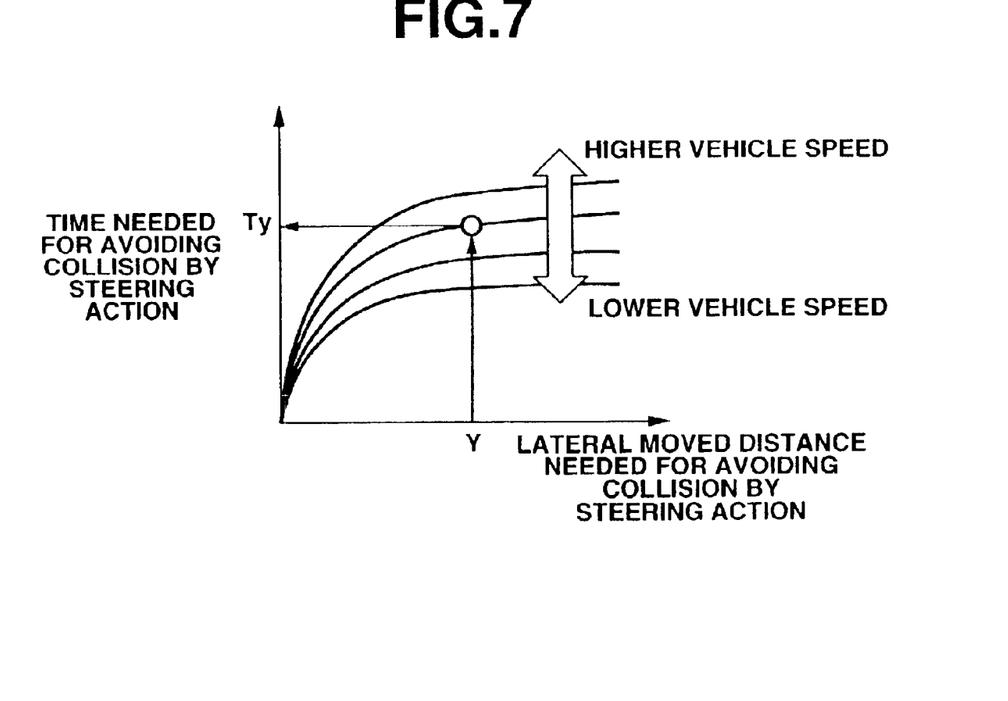
FIG. 7 is a characteristic graph depicting a relationship between a lateral moved distance needed for avoiding a collision by operating a steering wheel, a time needed for avoiding the collision by operating the steering wheel and a vehicle speed.

In the map of FIG. 7, the x-axis indicates the lateral moved distance "Y" needed for avoiding a collision by handling a steering wheel and the y-axis indicates the time "Ty" needed for avoiding a collision by handling the steering wheel. As shown, with increase of the needed lateral moved distance "Y", the needed time "Ty" increases, and with decrease of vehicle speed, the needed time "Ty" increases. Accordingly, in order to find out the time "Ty" needed for avoiding a collision against the preceding vehicle by handling a steering wheel, the map of FIG. 7 can be used.

If an estimated time "d/Vr" until a collision and the needed time "Ty" for avoiding the collision by handling the steering wheel satisfy the following inequality (7), judgment is so made that it is impossible to avoid the collision by handling the steering wheel.

$$d/Vr < Ty \quad (7)$$

Based on the results of execution of the equations (4), (5), (6) and (7), judgment is carried out as to whether avoidance of collision of own vehicle against the preceding vehicle is possible or not by handling a steering wheel. That is, the needed time for avoiding a collision by handling the steering wheel is calculated in accordance with the steering characteristic of the own vehicle, and thus, judgment for possibility of the collision is precisely carried out. Furthermore, in the present invention, the steering behavior characteristic of a driver in an emergency is practically used for calculating the time needed for avoiding the collision by handling steering wheel. Thus, much precise calculation of the needed time is obtained.

Referring back to FIG. 2, the operation flow goes to step S5 from step S4. At step S5, in case wherein at step S4 it has been judged that avoiding of collision by the steering action is possible, estimation is carried out as to whether after expiration of a predetermined time $T_{CS}$, avoiding of collision by the steering action is impossible or not. That is, if the following inequality (8) is satisfied or not:

$$d/Vr < Ty + T_{CS} \quad (8)$$

Referring back to the flowchart of FIG. 2, at step S6, judgment is carried out as to whether or not avoidance of collision is impossible by either of depressing the brake pedal (S2) and turning the steering wheel (S4). If YES, that is, when it is judged that the collision would not be avoided even when the brake pedal is depressed and the steering wheel is turned, the operation flow goes to step S7. At this step S7, an instruction signal is applied to braking force control device 15 (see FIG. 1) to produce a predetermined degree of braking force "$F_H$" instantly at a predetermined increasing speed.

If NO at step S6, that is, when it is judged that avoiding of collision is not impossible by depressing the brake pedal or turning the steering wheel, the operation flow goes to step S8. At this step S8, based on the results of step S3, that is, based on the results as to whether after expiration of the predetermined time $T_{CB}$, avoiding of collision by the braking action is impossible or not, judgment is carried out as to whether after expiration of the predetermined time $T_{CB}$, avoiding of collision by the braking action is impossible or not. If YES, that is, when it is judged that the collision avoiding is impossible, the operation flow goes to step S9.

At step S9, based on the results of step S5, that is, based on the results as to whether after expiration of the predetermined time $T_{CS}$, avoiding of collision by the steering action is impossible or not, judgment is carried out as to whether after expiration of the predetermined time $T_{CS}$, avoiding of collision by the steering action is impossible or not. If YES, that is, when it is judged that such collision avoidance is impossible, that is, when it is judged that after expiration of the predetermined time $T_{CB}$, collision avoidance by the braking action and after expiration of the predetermined time $T_{CS}$, collision avoidance by the steering action is impossible, the operation flow goes to step S10. At this step, an instruction signal is applied to braking force control device 15 (see FIG. 1) to produce a predetermined degree of braking force "$F_L$" that increases at a predetermined gradient "α" as is seen from the graph of FIG. 8.

While, if NO at step S8, that is, when it is judged that after expiration of the predetermined time $T_{CB}$, collision avoidance is not impossible, or if NO at step S9, that is, when it is judged that after expiration of the predetermined time $T_{CS}$, collision avoidance is not impossible, the operation flow goes to step S11. At this step S11, an instruction signal is applied to braking force control device 15 to cancel the braking force control operation. That is, when the own vehicle has no braking forced applied thereto, the condition of no braking force is still continued. While, when the braking force is being produced, control is so made that the braking force is gradually reduced at a predetermined reducing speed (viz., gradient) and finally reduced to zero. In the above-mentioned embodiment, rapid controlled reduction in the braking force is made. However, if desired, somewhat slower controlled reduction in the braking force may be employed in the present invention, which provides the driver and passengers with a smoothed braking feeling.

Figure 8:
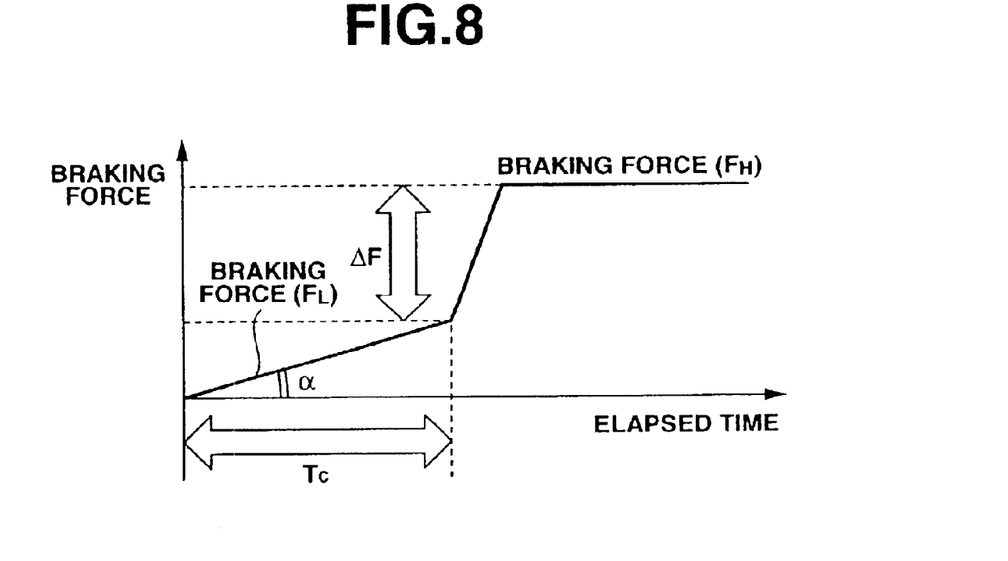
FIG. 8 is an illustration depicting a relationship between braking forces $F_L$ and $F_H$.

As is seen from the graph of FIG. 8, the above-mentioned braking force "$F_L$" is a force that gradually increases at a certain gradient "α", and the above-mentioned braking force "$F_H$" is set at a predetermined value that is greater than the braking force "$F_L$". As is seen from the graph, upon need of the higher braking force "$F_H$", the braking force "$F_L$" has already shown an increased value. Thus, when it is judged that avoidance of collision by either of the braking and steering actions is impossible, the higher braking force "$F_H$" is instantly obtained.

The gradient "α" of the braking force "$F_L$" is so determined that upon shifting of the braking force from value "$F_L$" to value "$F_H$", the difference "ΔF" appearing therebetween is smaller than a predetermined value. The difference "ΔF" is so determined as not to give a driver an uncomfortable braking shock. Concretely, the difference "ΔF" is determined by the following manner.

First, a time "$T_C$" that would pass from a time when the lower braking force "$F_L$" is actually applied to the road wheels and a time when the higher braking force "$F_H$" is actually applied to the road wheels is estimated. Since the time "$T_C$" indicates "$T_{CB}$" when after expiration of the predetermined time "$T_{CB}$", collision avoidance by the braking action is judged impossible and indicates "$T_{CS}$" when after expiration of the predetermined time "$T_{CS}$", collision avoidance by the steering action is judged impossible, the values "$T_{CB}$" and "$T_{CS}$" are used as "$T_C$". In case wherein after expiration of the predetermined time "$T_{CB}$" or "$T_{CS}$" collision avoidance by the braking action and that by the steering action are judged impossible, shorter one of the values "$T_{CB}$" and "$T_{CS}$" is selected and used as "$T_C$". It is to be noted that the needed time "$T_C$" is not limited to the above-mentioned one. That is, the needed time "$T_C$" may take another value at will. Based on this and by using the following equation (9), the gradient "α" for the braking force is determined. However, if the value "α" is sufficiently small, "tan α=α" is employable.

$$\tan \alpha = (F_H - \Delta F)/T_C \quad (9)$$

That is, the lower braking force "FL" is gradually increased at the gradient "α" (increasing speed) thus determined.

It is to be noted that the predetermined time "$T_{CB}$" used in the step S3 and the predetermined time "$T_{CS}$" used in the step S5 are so determined that the driver and passengers receive no uncomfortable braking shock at the time when the vehicle under a braked condition of lower braking force "$F_L$" is applied with a higher braking force "$F_H$". That is, the predetermined time "$T_{CB}$" or "$T_{CS}$" is determined based on a time needed when the lower braking force "$F_L$" increases from zero to a sufficiently large degree. For example, the time "$T_{CB}$" or "$T_{CS}$" is determined about 1.0 second. Of course, the times "$T_{CB}$" and "$T_{CS}$" are not limited to the fixed value. That is, if desired, such times "$T_{CB}$" and "$T_{CS}$" may be a value that varies depending on the vehicle speed and/or the relative vehicle speed "Vr".

It is further to be noted that the predetermined times "$T_{CB}$" and "$T_{CS}$" need not have always the same value. That is, the predetermined times "$T_{CB}$" and "$T_{CS}$" may have different values.

In the following, operation of the automatic brake system of the present invention will be described.

When a preceding vehicle is running ahead of the own vehicle, information signals issued by laser-radar 1 are led into control unit 10, and based on the signals, control unit 10 derives the vehicle interval distance "d" and the relative vehicle speed "Vr", and derives the respective angles defined by the right and left rear edges of the preceding vehicle relative to the laser-emitter of the own vehicle in the above-mentioned manner.

When now, as is seen from FIG. 2, the preceding vehicle is running on a traveling line that is more left than that of the own vehicle, both the angles "$\theta_1$" and "$\theta_2$" of the right and left rear edges of the preceding vehicle relative to the laser-emitter of the own vehicle are detected. The smaller angle "$\theta_1$" is selected, and based on the selected smaller angle "$\theta_1$", the needed lateral moved distance "Y" is calculated (see step S1 of FIG. 2).

When the vehicle interval distance "d" between the preceding and own vehicles is sufficiently large and the relative vehicle speed "Vr" therebetween is sufficiently large, the inequality (2) is satisfied. In this case, judgment is so made that a collision against the preceding vehicle can be avoided by depressing the brake pedal (step S2). Furthermore, if the inequality (3) is satisfied, judgment is so made that after expiration of the predetermined time "$T_{CB}$", collision avoidance by the braking action is possible (step S3). Then, the time "Ty" needed for moving the own vehicle by the lateral moved distance "Y" is calculated. And, if the needed time "Ty" fails to satisfy the inequality (7), judgment is so made that the collision can be avoided by turning the steering wheel (step S4), and if the needed time "Ty" fails to satisfy the inequality (8), judgment is so made that also after expiration of the predetermined time "$T_{CS}$", the collision can be avoided by turning the steering wheel (step S5).

Accordingly, in the above-mentioned case, the operation flow passes through step S6, step S8 and step S11 canceling operation of braking force control device 15.

Accordingly, as is described hereinabove, when the vehicle interval distance "d" is relatively long, and thus, when it is judged that collision avoidance is possible by the braking action or the steering action and that also after expiration of the predetermined time "$T_{CB}$" or "$T_{CS}$", the collision avoidance is possible by the braking action or the steering action, braking force control device 15 does not operate to produce a braking force for braking the vehicle. That is, when the vehicle is under a condition wherein a collision against the preceding vehicle is possible by depressing the brake pedal or turning the steering wheel, braking force control device 15 does not operate.

When thereafter the relative vehicle interval distance "d" becomes shorter to such a degree that the inequality (2) is satisfied (step S2) but the inequality (3) is not satisfied, or when the vehicle comes to a condition wherein it is judged that after expiration of the predetermined time "$T_{CB}$", collision avoidance by the braking action is impossible (step S3) but collision avoidance by the steering action is possible and after expiration of the predetermined time "$T_{CS}$", the collision avoidance by the steering action is possible (steps S4 and S5), estimation is so made that after expiration of the predetermined time "$T_{CB}$", collision avoidance by the braking action is impossible but collision avoidance by the steering action is possible. Accordingly, operation flow goes through step S6 and step S8 to step S11, and thus production of the braking force by braking force control device 15 is not carried out.

Under a condition wherein collision avoidance by the braking action is impossible, but the collision avoidance by the steering action is possible even after expiration of the predetermined time "$T_{CS}$", the operation flow goes through step S6, step S8 and step S9 to step S11. Thus, production of the braking force by braking force control device 15 is not carried out.

When, then, a condition is established wherein it is judged that collision avoidance by the braking action is impossible after expiration of the predetermined time "$T_{CB}$", or a condition is established wherein it is judged that collision avoidance by the braking action is impossible, collision avoidance by an instant steering action is possible and collision avoidance by the steering action after expiration of the predetermined time "$T_{CS}$" is impossible, the operation flow goes through steps S6, S8 and S9 to step S10 causing braking force control device 15 to produce the controlled lower braking force "$F_L$".

Figure 9:
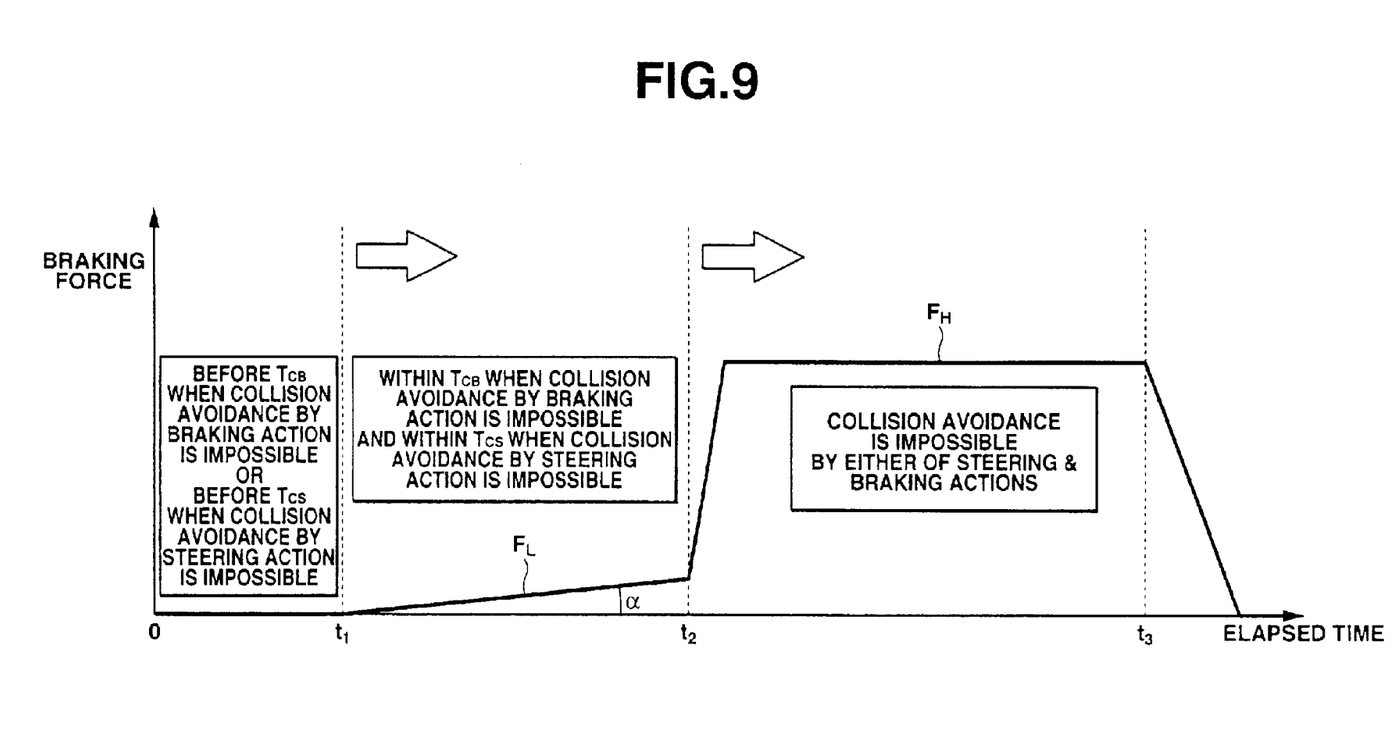
FIG. 9 is an illustration depicting the operation carried out by the invention.

Accordingly, as is seen from the graph of FIG. 9, from the time "$t_1$" when it is judged that collision avoidance by the braking action within the predetermined time "$T_{CB}$" is impossible and collision avoidance by the steering action within the predetermined time "$T_{CS}$" is also impossible, braking force control device 15 generates the lower braking force "$F_L$" that increase from 0 (zero) with the certain gradient "$\alpha$".

Within a time for which collision avoidance by the steering action is possible while that by the braking action is impossible, the lower braking force "$F_L$" is kept generated by the device 15 and generally increased.

At the time "$t_2$", the vehicle interval distance "d" becomes to fail to satisfy the inequality (7) and thus it becomes judged that collision avoidance by the steering action is impossible. Upon this, it is judged that collision avoidance is impossible by both the braking action and steering action. Thus, the operation flow goes through step S6 to step S7 controlling braking force control device to produce the higher braking force "$F_H$".

Accordingly, as is seen from the graph of FIG. 9, the larger braking force "$F_H$" is generated at the time "$t_2$", that is larger than the smaller braking force "$F_L$". That is, in case wherein collision avoidance is judged impossible by either the braking action and steering action by the driver, that is, when the collision avoidance is judged impossible by the action of the driver, a braking force is automatically and rapidly generated by braking force control device 15, that is the higher braking force "$F_H$". Thus, collision of the own vehicle against the preceding vehicle can be avoided.

As has been mentioned hereinabove, at the time "$t_2$", the larger braking force "$F_H$" is applied to associated road wheels. At the time "$t_1$" when expiration of the predetermined time "$T_{CB}$" or "$T_{CS}$" is made, the lower braking force "$F_L$" starts to be produced, and thereafter, the force "$F_L$" is generally increased. And, at the time "$t_2$" when the higher braking force "$F_H$" starts to be generated, the difference then appearing between the lower force "$F_L$" and the higher force "$F_H$" is smaller than the predetermined threshold value "$\Delta F$", and thus, application of such higher braking force "$F_H$" to the road wheels at that time "$t_2$" does not provide the driver and passenger with uncomfortable brake shock.

While, when a change is made from a condition wherein, due to relatively short vehicle interval distance "d" and relatively small relative vehicle speed "Vr", collision avoidance by the braking action and steering action is judged possible even after expiration of the predetermined time "$T_{CB}$" or "$T_{CS}$" to a condition wherein collision avoidance by the steering action is judged impossible after expiration of the predetermined time "$T_{CS}$", the operation flow goes through step S6 to step S8. But, within a time for which collision avoidance by the braking action is kept judged possible even after expiration of the predetermined time "$T_{CB}$", the operation flow comes to step S11. In this case, no braking force is produced by braking force control device 15.

Furthermore, even if it is judged that collision avoidance by the steering action is impossible, the operation flow goes through step S6 and step S8 to step S11 for a time in which it is judged that collision avoidance by the braking action is possible. Of course, also in this case, no braking force is produced by the device 15.

When, then a change is made from the above-mentioned condition to a condition wherein collision avoidance by the steering action is judged impossible after expiration of the predetermined time "$T_{CS}$" or a condition wherein collision avoidance by the steering action is judged impossible, collision avoidance by the current braking action is judged possible and collision avoidance by the steering action is judged impossible after expiration of the predetermined time "$T_{CB}$", the operation flow goes through steps S6, S8 and S9 to step S10. In this case, brake force control device 15 produces the smaller braking force "$F_L$".

Furthermore, even if it is judged that collision avoidance by the steering action is impossible, the device 15 keeps producing the lower braking force "$F_L$" for a time in which collision avoidance by the braking action is judged possible. During this, the braking force "$F_L$" is gradually increased.

At the time "$t_2$" (see FIG. 9) when collision avoidance by both the braking and steering actions is estimated impossible, brake force control device 15 starts production of the higher braking force "$F_H$". As is described hereinabove, since the difference between these two braking forces "$F_L$" and "$F_H$" is set smaller than the threshold value "$\Delta F$", production of the higher braking force "$F_H$" provides the driver and passengers with no uncomfortable brake shock.

Upon this, higher braking force "$F_H$" is applied to the road wheels of the own vehicle, and thereafter, the driver carries out a steering action or braking action, so that a safety distance "d" is provided between the preceding and own vehicles and the relative vehicle speed "Vr" therebetween is reduced. When, at the time "$t_3$" when the inequalities (3) and (8) are established, the operation flow of the flowchart goes through steps S8 or S9 to step S11. At this step, braking force "$F_H$" generated by braking force control device 15 is gradually reduced with a certain gradient as is seen from the graph of FIG. 9. The gradual reduction of the braking force "$F_H$" does not give the driver uncomfortable braking shock.

As is described hereinabove, in case of automatically producing a braking force by braking force control device 15, the lower braking force "$F_L$" is gradually increased from 0 (zero) to a certain level and in case of stopping the braking force, the braking force "$F_H$" is gradually reduced to 0 (zero). Thus, application and removal of the braking force "$F_L$" or "$F_H$" to and from the own vehicle do not provide a driver and passengers with an uncomfortable brake shock.

Figure 10:
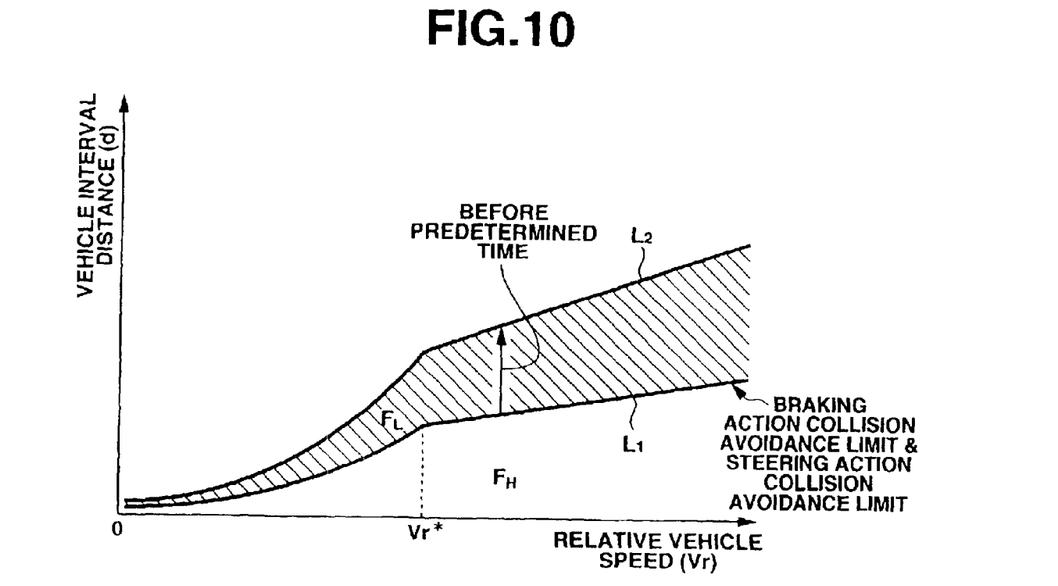
FIG. 10 is a characteristic graph showing an operation range of braking force.

FIG. 10 is a graph showing an operation zone of the braking force produced by braking force control device 15, with respect to relative vehicle speed "Vr" and vehicle interval distance "d".

As is described hereinabove, the judgment as to collision avoidance by the braking action and steering action is carried out based on the inequalities (2) and (7). That is, the judgment is made based on relative vehicle speed "Vr" as well as vehicle interval distance "d".

As is seen from the curve "$L_{11}$" of FIG. 11 that indicates a limit (which will be referred to as "braking action collision avoidance limit" hereinafter) of vehicle interval of the distance "d" that enables the collision avoidance by the braking action, the braking action collision avoidance limit "$L_{11}$" is increased exponentially with increase of relative vehicle speed "Vr". While, as is seen from the curve "$L_{12}$" of FIG. 11 that indicates the limit (which will be referred to as "steering action collision avoidance limit hereinafter) of vehicle interval distance "d" that enables the collision avoidance by the steering action, the steering action collision avoidance limit "$L_{12}$" is increased linearly with increase of relative vehicle speed "Vr".

Accordingly, as is seen from FIG. 10, when relative vehicle speed "Vr" is smaller than a coincided relative vehicle speed "Vr*" at which the braking action collision avoidance limit "$L_{11}$" and the steering action collision avoidance limit "$L_{12}$" are coincided, the limit that makes both collision avoidance by braking action and that by steering action impossible is indicated by the characteristic line "$L_1$" that includes a part of the limit "$L_{11}$" appearing below the relative speed "Vr*" and a part of the limit "$L_{12}$" appearing above the relative speed "Vr*". Accordingly, a zone below the characteristic line "$L_1$" represents the zone where the higher braking force "$F_H$" is produced.

Characteristic line "$L_2$" is a line that indicates a vehicle interval distance "d" that makes collision avoidance by both braking action and steering action after expiration of the predetermined time "$T_{CB}$" or "$T_{CS}$" impossible. As shown, in the zone where the relative vehicle speed "Vr" is larger than the coincided relative vehicle speed "Vr*", the line "$L_2$" indicates a value "d" that differs from the line "$L_1$" by a degree corresponding to the predetermined time "$T_{CS}$", and in the zone where the relative vehicle speed "Vr" is smaller than the coincided relative vehicle speed "Vr*", the line "L2" indicates a value "d" that differs from the line "$L_1$" by a degree corresponding to the predetermined time "$T_{CB}$". Accordingly, the area sandwiched between the lines "$L_1$" and "$L_2$" indicates the zone where the smaller braking force is produced.

Figure 11:
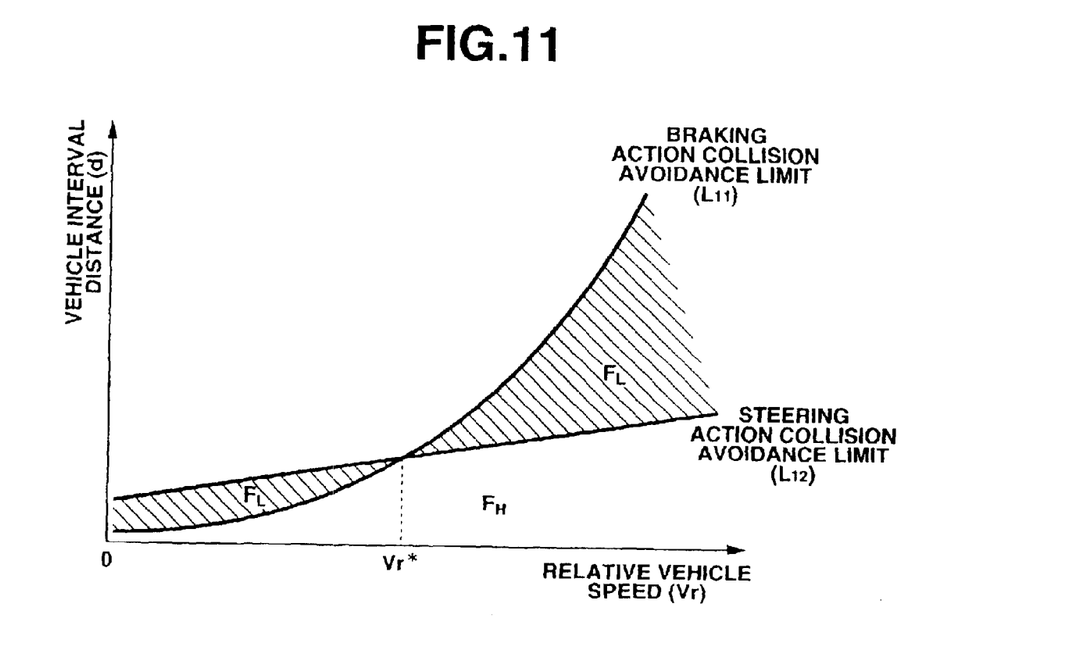
FIG. 11 is a characteristic graph showing a collision avoidance limit by a braking action and a collision avoidance limit by a steering action.

As is seen from the graph of FIG. 11, when the relative vehicle speed "Vr" shows the coincided relative vehicle speed "Vr*", the two limit curves "$L_{11}$" and "$L_{12}$" cross each other. Accordingly, as is seen from this graph, in case wherein when collision avoidance by braking action or steering action is estimated impossible, the lower braking force "$F_L$" is generated and when collision avoidance by braking action and steering action is estimated impossible, the higher braking force "$F_H$" is generated, the following possibility may be thought out. That is, at the zone near the point where the relative vehicle speed "Vr" is the coincided relative vehicle speed "Vr*", the higher braking force "$F_H$" is suddenly produced before the lower braking force "$F_L$" shows a sufficiently large force or when the lower braking force "$F_L$" shown 0 (zero). Of course, in this case, a certain brake shock is applied to the driver and passengers.

However, as is described hereinabove, in the present invention, at the time when collision avoidance by braking action and steering action is estimated impossible after expiration of the predetermined time "$T_{CB}$" or "$T_{CS}$", the lower braking force "$F_L$" starts to be produced. Accordingly, at the time when the higher braking force "$F_H$" actually starts to be produced due to the estimation of collision avoidance by the braking action and steering action, the lower braking force "$F_L$" has been sufficiently increased to a level of the higher braking force "$F_H$". Accordingly, undesirable brake shock is not applied to the driver and the passengers.

Furthermore, in this case, judgment is also carried out as to whether collision avoidance by braking and steering actions after expiration of the predetermined time is possible or not, and based on this judgment, production or non-production of the lower braking force "$F_L$" is carried out. Accordingly, the higher braking force "$F_H$" can start its generation timingly.

During this, that is, during the predetermined time "$T_{CB}$" or "$T_{CS}$", the lower braking force "$F_L$" is kept produced. Thus, at the time when the higher braking force "$F_H$" is actually produced, smoothed force transfer from the lower braking force "$F_L$" to the higher braking force "$F_H$" is carried out, which suppresses or at least minimizes the brake shock applied to the driver and the passengers.

As is seen from the graph of FIG. 10, the timing on which production of the lower braking force "$F_L$" starts is determined by the characteristic line "$L_2$" that includes a part depending on both the braking action collision avoidance limit "$L_{11}$" and the predetermined time "$T_{CB}$" and a part depending on both the steering action collision avoidance limit "$L_{12}$" and the predetermined time "$T_{CS}$". Thus, if the predetermined time "$T_{CB}$" is set relatively long, generation of the lower braking force "$F_L$" starts at an early timing, that is, at a time when the relative vehicle speed "Vr" is relatively small and the relative distance "d" is relatively large. While, if the predetermined time "$T_{CS}$" is set relatively long, generation of the lower braking force "$F_L$" starts at an early timing, that is, at a time when the relative vehicle speed "Vr" is relatively large and the relative distance "d" is relatively large. Accordingly, if the predetermined times "$T_{CB}$" and "$T_{CS}$" are controlled in accordance with the driving manner of each driver, production of the lower braking force "$F_L$" is timingly made for each driver.

Furthermore, in the present invention, the timing on which production of the braking force starts is controlled depending on the characteristic of the own vehicle, such as the steering characteristic, as well as the vehicle interval distance "d" and the relative vehicle speed "Vr". Accordingly, in the present invention, judgment as to whether collision avoidance is possible or not can be precisely carried out without depending on the steering characteristic that varies depending on the class of the vehicles and the vehicle speed. Furthermore, in the present invention, the collision avoidance steering timing is calculated in accordance with the steering wheel handing manner that would be taken by a driver in an emergency. Thus, the collision avoidance can be precisely made.

In the present invention, when collision avoidance by braking action and steering action is judged impossible, staring of production of the lower braking force "$F_L$" is made at a time that is prior to the time when starting of production of the higher braking force "$F_H$" should be made, that is, at a time when upon expiration of the predetermined time it is estimated that collision avoidance by braking action and steering action is impossible. The lower braking force "$F_L$" is gradually increased and upon need of the higher braking force, production of the higher braking force "$F_H$" starts. That is, at the time when production of the higher braking force "$F_H$" starts, the lower braking force "$F_L$" shows a relatively higher level. This brings about a smoothed braking applied to the vehicle.

In the present invention, judgment as to whether collision avoidance by braking action and judgment as to whether collision avoidance by steering action are carried out and when it is judged that collision avoidance is impossible by braking action and steering action, production of the higher braking force "$F_H$" starts. Accordingly, in case wherein collision avoidance is judged possible by steering action or braking action, production of unnecessarily large braking force can be avoided.

In the present invention, judgment as to whether collision avoidance by steering action is possible or not is made based on the lateral moved distance. Accordingly, even when there is an offset in the traveling direction between the preceding vehicle and own vehicle, the collision avoidance by the steering action is precisely carried out with reference to the offset degree. Furthermore, for judging collision avoidance by steering action based on the lateral moved distance, characteristic of own vehicle, steering characteristic of own vehicle and the steering characteristic of the driver are used as factors to achieve the results. Thus, judgment as to whether collision avoidance by steering action is possible or not can be precisely carried out without depending on the steering characteristic of the own vehicle and that of the driver.

Furthermore, in the present invention, for determining the lateral moved distance, smaller one of the angles "$\theta_1$" and "$\theta_2$" of the right and left rear edges of the preceding vehicle is used as a factor. Thus, collision avoidance by steering action is much precisely carried out. When, upon judgment, it is estimated that collision avoidance is possible by steering action, unnecessary automatic braking force is not produced. Thus, when it is judged that collision avoidance is possible by steering the own vehicle in a rightward or leftward direction, production of the braking force is not carried out, which suppresses production of unnecessary braking force.

The entire contents of Japanese Patent Application 2001-377716 (filed Dec. 11, 2001) are incorporated herein by reference.

Although the invention has been described above with reference to the embodiment of the invention, the invention is not limited to such embodiment as described above. Various modifications and variations of such embodiment may be carried out by those skilled in the art, in light of the above description.

What is claimed is:

1. An automatic brake system of a motor vehicle that has a brake pedal and a steering wheel installed therein, the system comprising:

a first section that detects a relative connection between the vehicle and a preceding object ahead of the vehicle, said relative connection being provided based on a relative vehicle interval distance and a relative vehicle speed between the vehicle and the preceding object;

a second section that, when actuated, produces a braking force applied to the vehicle, the braking force produced by the second section being isolated from a braking force produced by the brake pedal;

a third section that, based on the relative connection detected by the first section, carries out a judgment as to whether or not a possible collision of the vehicle with the preceding object is avoidable by operation of at least one of the steering wheel and the brake pedal;

a fourth section that, based on the relative connection detected by the first section, carries out an estimation as to whether or not, after expiration of a predetermined time from the time of detection of the relative connection, a possible collision of the vehicle with the preceding object is avoidable by operation of at least one of the steering wheel and the brake pedal;

a fifth section that actuates and controls the second section in accordance with both a result of the judgment made by the third section and a result of the judgment made by the fourth section, thereby to control the braking force applied to the vehicle, wherein the fifth section is configured to carry out:

causing the second section to produce a first grade braking force when the fourth section estimates that after expiration of the predetermined time the possible collision would be unavoidable by operation of either of the steering wheel and the brake pedal; and causing the second section to produce a second grade braking force when the third section judges that the possible collision would be unavoidable by operation of either of the steering wheel and the brake pedal, the second grade braking force being greater than the first grade braking force.

2. An automatic brake system as claimed in claim 1, in which each of the third and fourth sections is configured to carry out:

calculating, based on the relative connection detected by the first section, a lateral moved distance that is needed for avoiding the collision by operating the steering wheel;

calculating, based on the calculated lateral moved distance, a first time needed by the vehicle for moving by the lateral moved distance;

calculating a second time that passes until a time when the vehicle would collide against the preceding object; and judging, based on both the first time and second time, whether the collision avoidance by operating the steering wheel is possible or not.

3. An automatic brake system as claimed in claim 2, in which each of the third and fourth sections is configured to derive the lateral moved distance based on a positional relationship between the vehicle and each of lateral rear edges of the preceding object.

4. An automatic brake system as claimed in claim 3, in which said third section is configured to carry out determining, based on the positional relationship between the vehicle and each of lateral rear edges of the preceding object, a turning direction of the steering wheel that would induce a higher possibility of avoiding the collision.

5. An automatic brake system as claimed in claim 4, in which said third section is configured to carry out:

calculating a first lateral moved distance that would be provided when the steering wheel is turned in one direction to avoid the collision;

calculating a second lateral moved distance that would be provided when the steering wheel is turned in the other direction to avoid the collision; and determining smaller one of the first and second lateral moved distances as the needed lateral moved distance.

6. An automatic brake system as claimed in claim 2, in which the second time is calculated based on dimensional and drivability features of the vehicle.

7. An automatic brake system as claimed in claim 2, in which the second time is calculated based on a steering behavior characteristic of a driver in an emergency.

8. An automatic brake system as claimed in claim 1, in which the first grade braking force produced by the second section is gradually increased with passage of time, and a gap appearing between the first grade braking force and the second grade braking force at the time when the braking force produced by the second section switches from the first grade braking force to the second grade braking force is smaller than a predetermined value.

9. An automatic brake system as claimed in claim 1, in which said predetermined time is determined based on a time for which the first grade braking force is kept produced prior to starting production of the second grade braking force.

10. An automatic brake system as claimed in claim 1, in which the fourth section estimates, based on both a first predetermined time used for estimating whether the possible collision is avoidable or not by operating the steering wheel and a second predetermined time used for estimating whether the possible collision is avoidable or not by operating the brake pedal, a condition that would take place after expiration of the predetermined time.

11. An automatic brake system of a wheeled motor vehicle that has a brake pedal and a steering wheel installed therein, the system comprising:
    first means that detects a relative connection between the vehicle and a preceding object ahead of the vehicle, said relative connection being provided based on a relative vehicle interval distance and a relative vehicle speed between the vehicle and the preceding object;
    second means that, when actuated, produces a braking force applied to the vehicle, the braking force produced by the second means being isolated from a braking force produced by the brake pedal;
    third means that, based on the relative connection detected by the first means, carries out a judgment as to whether or not a possible collision of the vehicle with the preceding object is avoidable by operation of at least one of the steering wheel and the brake pedal;
    fourth means that, based on the relative connection detected by the first means, carries out an estimation as to whether or not, after expiration of a predetermined time from the time of detection of the relative connection, a possible collision of the vehicle with the preceding object is avoidable by operation of at least one of the steering wheel and the brake pedal;
    fifth means that actuates and controls the second means in accordance with both a result of the judgment made by the third means and a result of the judgment made by the fourth means, thereby to control the braking force applied to the vehicle,
    wherein the fifth means is configured to carry out:
        causing the second means to produce a first grade braking force when the fourth means estimates that after expiration of the predetermined time the possible collision would be unavoidable by operation of either of the steering wheel and the brake pedal; and
        causing the second means to produce a second grade braking force when the third means judges that the possible collision would be unavoidable by operation of either of the steering wheel and the brake pedal, the second grade braking force being greater than the first grade braking force.

* * * * *